(12) United States Patent
Mele

(10) Patent No.: US 10,239,220 B2
(45) Date of Patent: Mar. 26, 2019

(54) LASER DEVICE BATTERY POWERED, WHICH SHOWS THE CUTTING PATH TO GET EQUAL PORTIONS OF A CAKE, PIZZA OR SIMILAR FOOD

(71) Applicant: Antonio Mele, Lugano (CH)

(72) Inventor: Antonio Mele, Lugano (CH)

( * ) Notice: Subject to any disclaimer, the term of this patent is extended or adjusted under 35 U.S.C. 154(b) by 67 days.

(21) Appl. No.: 15/535,045

(22) PCT Filed: Nov. 30, 2015

(86) PCT No.: PCT/IT2015/000290
§ 371 (c)(1),
(2) Date: Jun. 10, 2017

(87) PCT Pub. No.: WO2016/092575
PCT Pub. Date: Jun. 16, 2016

(65) Prior Publication Data
US 2017/0320222 A1    Nov. 9, 2017

(30) Foreign Application Priority Data
Dec. 12, 2014    (IT) .............................. NA2014A0043

(51) Int. Cl.
*G01B 11/26* (2006.01)
*B26B 29/06* (2006.01)
*A21C 15/04* (2006.01)

(52) U.S. Cl.
CPC ............ *B26B 29/063* (2013.01); *A21C 15/04* (2013.01)

(58) Field of Classification Search
CPC .................................................... B26B 29/063
USPC ................................... 33/277, 286, 524, 525
See application file for complete search history.

(56) References Cited

U.S. PATENT DOCUMENTS

| | | | | |
|---|---|---|---|---|
| 2,960,770 A * | 11/1960 | Valenta | .................. | A47G 19/00 33/1 F |
| 3,130,764 A * | 4/1964 | Donovan | ............... | B26D 3/245 33/482 |
| 3,477,135 A * | 11/1969 | Haapala | .................. | A23G 3/28 33/525 |
| 4,676,005 A * | 6/1987 | Seligman | ............... | A21C 15/00 33/1 F |
| 7,908,750 B2 * | 3/2011 | Goick | .................. | A21C 15/005 33/286 |
| 2015/0134571 A1 * | 5/2015 | Getzinger | ............ | A47G 19/022 705/500 |
| 2018/0001499 A1 * | 1/2018 | Stojanovski | ............ | A47J 37/01 |
| 2018/0199580 A1 * | 7/2018 | Waymire | .................. | A47J 9/00 |

* cited by examiner

*Primary Examiner* — G. Bradley Bennett
(74) *Attorney, Agent, or Firm* — R. Ruschena Patent Agent, LLC

(57) ABSTRACT

This invention has the aim to assist the cutting of a cake, pizza or other similar foods through a battery-powered laser device, which shows the cutting path to get equal portions of a cake, pizza or similar foods; the laser light beam displays a cutting line through which a knife, or other tool pass to cut a equal number of portions according to a user's need.

3 Claims, 2 Drawing Sheets

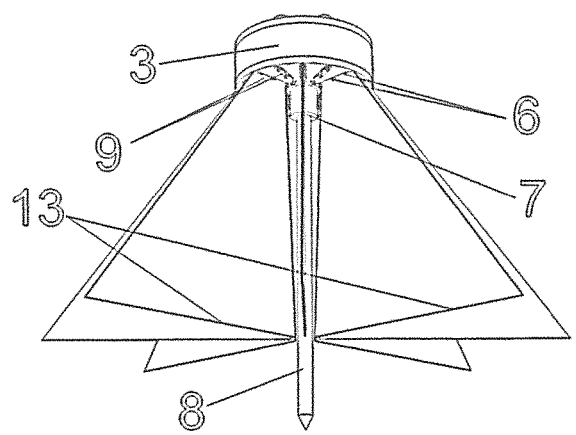
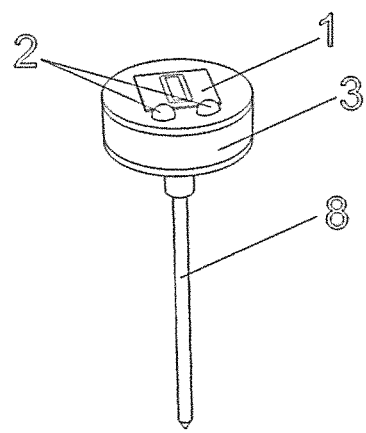
Fig. 1  Fig. 2
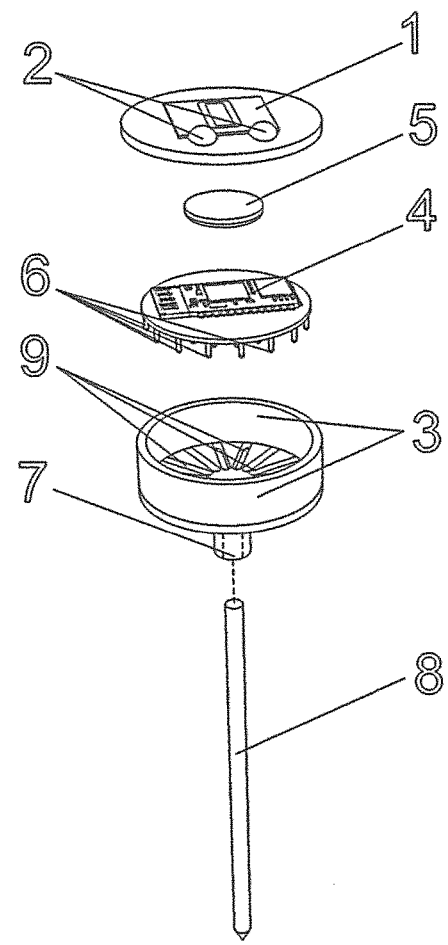
Fig. 3

LASER DEVICE BATTERY POWERED, WHICH SHOWS THE CUTTING PATH TO GET EQUAL PORTIONS OF A CAKE, PIZZA OR SIMILAR FOOD

BACKGROUND OF THE INVENTION

Field of the Invention

This invention has the aim to assist the cutting of the cake (10) pizza or other similar foods (11) through a digital device.

In particular, it is a laser device, battery powered, which shows the cutting path to get equal portions of a cake, pizza or similar foods, FIG. 1 and FIG. 2, FIG. 4 and FIG. 5.

SUMMARY OF THE INVENTION

The device has the function to show the cutting path of a cake (10), pizza or similar foods (11), by means of a laser light beam (13), which displays the line through which the knife (12), or other tool pass to cut the portions FIG. 4 and FIG. 5.

In occasion of events, conferences, or whether of a meeting between friends, the food always is involved.

It represents not only a key element for refreshments, but also a perfect moment for socializing with friends, acquaintances and family. It is no longer a simple act of nourishment, but an important moment of sharing and exchange of emotions. When we have to prepare food for a large group of people, often we need to invest a lot of time to prepare in advance delicacies and specialties, and the preparation of foods for many people it is quite laborious.

In these cases, the most convenient solution to quickly prepare and handle a large quantity of food is to prepare slice food such as pizzas, buns, wraps, cakes, pastries, pancakes.

However, in a big banquet, although it is slice food to cut, also the food cutting requires a lot of time and patience. In particular, when we have to cut the food quickly and for many people, it is impossible to obtain equal portions, especially when foods are different for size and shape, and we will never have a perfect result.

The partition into portions, moreover, it is also important for conservation of foods and for planning their consumption.

The partition of a food in equal parts for example, allows us to consume a part and keep the remaining one.

Moreover, it is always difficult to make a previous count of how many portions we need, so that everyone can gets his fair part; so, someone remains without its portion, or a too small or too large slice.

BACKGROUND ART

The state of the art includes many items designed for resolution of cutting food. There are many devices on the market for slicing cake, pizza or similar foods: there are mechanical wheel, wire, stampings, paddle, knives, tools, spaced blades, special scissors, and so on.

Until now, the technology doesn't make this field easier, because it focused on other goals and problems. There are many products aimed at the convivial kitchen, used both outside and home, such as home appliances, plates and hobs details, but there's no solution to assist cutting of foods.

In addition, the mechanical cutting pre-existing devices have the restriction of not being able to be adjusted to our needs. There are only pre-formed molds, shape and measures that, although creating proportionate portions, cannot be changed in sizes, shapes and dimensions we need.

BRIEF DESCRIPTION OF THE DRAWINGS

FIG. 1: Perspective view of the invention showing the beam of laser light (13) when it's turned on.

FIG. 2: Perspective view of the invention showing the beam of laser light (13) when it's turned off.

FIG. 3: Perspective view of the exploded invention showing all its essential elements

BRIEF DESCRIPTION OF THE INVENTION

The device of this invention is able to slice a food of any size and shape, dividing it into portions of any size and shape, creating a number of portions according to user's need.

Figure 4:
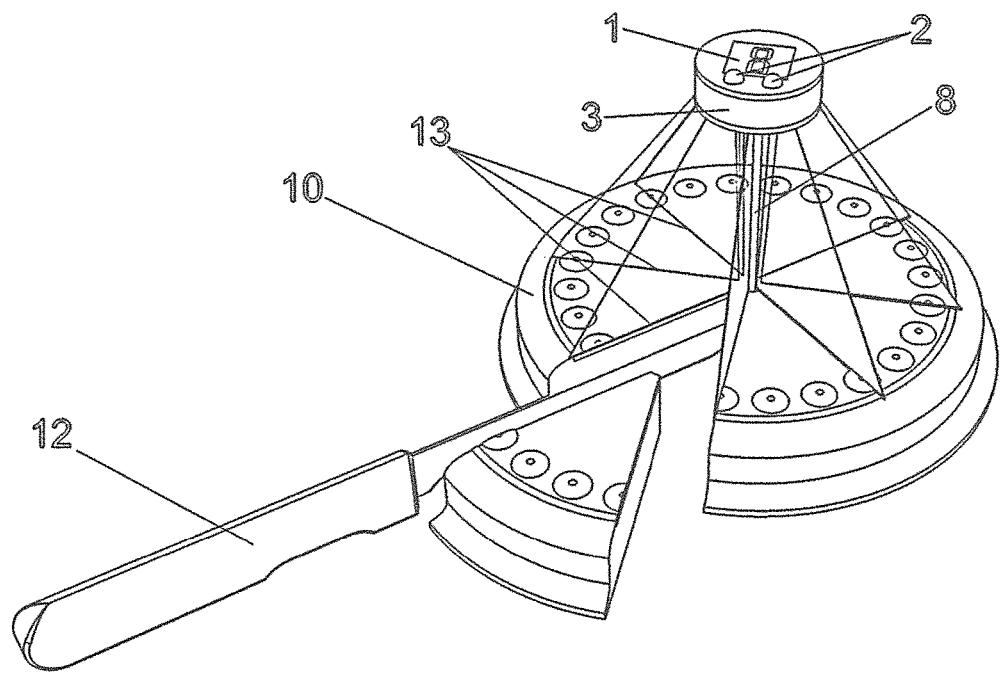
FIG. 4: Perspective view showing the application of the invention during the cutting of a cake (10); the laser light (13) beamed onto the surface of the cake outlines the cutting path to be made in order to obtain eight slices in equal parts, shown in the display (1).
Figure 5:
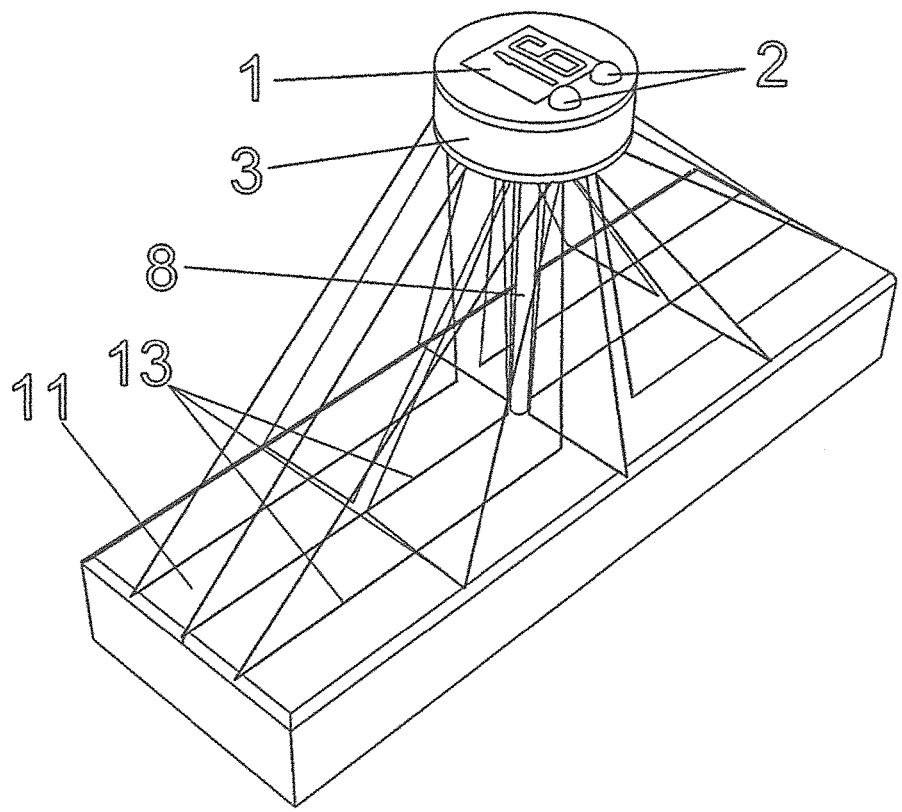
FIG. 5: Perspective view showing another application of the invention during the cutting of another food (11) similar to a cake (10), to be divided into sixteen equal parts, as shown in the display (1).

An important feature is that the light beam, emitted by one or more lasers (6), on the surface of the cake (10) pizza or similar foods (11), can be changed, so that a path is showed on the surface of the cake (10) pizza or similar foods (11) that indicates the way for cutting the desired shape or the number of equal parts we want to obtain from cake (10) pizza or similar foods (11) FIG. 4 and FIG. 5.

DETAILED DESCRIPTION OF THE INVENTION

The device is provided with a digital display (1), provided with commands that allow the planning of the number of portions to be created and the shape we want to obtain from cut, checking data on the display FIG. 4 and FIG. 5. The device comprises a small box-shaped support (3), provided with an interlocking hole (7) in the lower part, for the insertion of a rod (8) that holds it up when the other extremity of the rod is positioned in the central part of a cake (10), pizza or similar foods (11), to be divided in equal portions and, always in the lower part of the small box-shaped support (3), there are grooves (9) from which it is emitted a light beam generated (13) by a laser or a set of lasers (6); The rod (8) has the peculiarity of being removable: after using it, it is possible to remove it from the device in order to wash it and dry it like any other tool, and then reuse it again, at any time FIG. 3. The laser or set of lasers (6) included in the small box-shaped support (3), has a beam of light (13) towards the direction of the rod (8) in the cake (10) pizza or similar foods (11), which emits a laser light beam (13) on the surface of the cake (10), pizza or similar foods (11), showing the cutting path to get equal portions of a cake (10), pizza or similar foods (11); The device works thanks to a circuit (4), connected to a laser or a set of lasers (6), programmed with an algorithm which allows to change the number of portions or the shape of the cutting path for division in equal parts of the cake (10), pizza or similar foods (11) by means of one or more command buttons (2). Therefore, entering through the adjustment buttons the number of slices we want to achieve and the shape we need, the command we sent is processed by the device FIG. 2 and FIG. 3.

The display (1) is positioned on the small box-shaped support (3), on the side opposite to the rod (8) insertion side, and displays the number of portions we want to get from the cutting path to get equal portions of a cake (10), pizza or similar foods (11) FIG. 4 and FIG. 5.

The device works with battery. The battery (5), included in the small box-shaped support (3), supplies the circuit (4), the laser or the set of lasers (6) and the display (1).

Therefore it doesn't require any power supply, cable or other loading device, because it is sufficient to replace the battery when it is exhausted, FIG. 3.

The invention claimed is:

1. A laser device battery powered, which shows a cutting path to get equal portions of a cake, pizza or similar foods, comprising:

A small box-shaped support (3), provided with an interlocking hole (7) in its lower part, for the insertion of a rod (8) that holds it up when an other extremity of the rod is positioned in a central part of a cake (10), pizza or similar foods (11), to be divided into equal portions and, always in a lower part of said small box-shaped support (3), there are grooves (9) from which it is emitted a light beam generated by a laser or a set of lasers (6);

a laser or a set of lasers (6) included inside the small box-shaped support (3), having a beam of light (13) towards the direction of the rod (8) inserted in the center of a cake (10), pizza or similar foods (11), said laser or a set of lasers (6) emit a laser light beam (13) on the top surface of the cake (10), pizza or similar foods (11), said laser light beam (13) is showing a cutting path to obtain equal portions of a cake (10), pizza or similar foods (11);

a circuit (4), connected to a laser or a set of lasers (6), programmed with an algorithm which allows to change the equal number of portions or a shape of the cutting path for dividing into equal parts a cake (10), pizza or similar foods (11) by means of one or more command buttons (2);

a display (1) positioned on the small box-shaped support (3), on a side opposite to the rod (8) insertion side, which displays the number of portions a user wants to get from the cutting path to obtain equal portions of a cake (10), pizza or similar foods (11);

a battery (5), included inside the small box-shaped support (3), which supplies electric power to a circuit (4), the laser or the set of lasers (6) and the display (1).

2. A laser device, battery powered, which shows the cutting path to obtain equal portions of a cake, pizza or similar foods, in accordance with claim 1, wherein said light beam (13) emitted by a laser or a set of lasers (6) on the surface of the cake (10), pizza or similar foods (11), can be adjusted displaying a cutting path on the surface of a cake (10), pizza or similar foods (11) that shows the required shape, or the number of equal portions a user wants to get by cutting a cake (10) pizza or similar foods (11).

3. A laser device, battery powered, which shows the cutting path to obtain equal portions of a cake, pizza or similar foods, in accordance with claim 1, wherein said rod (8) is inserted into the central part of a cake (10), pizza or similar foods (11), holding the small box-shaped support (3) which projects the cutting path to obtain equal portions of a cake (10), pizza or similar foods (11) on the surface of a cake (10), pizza or similar foods (11) through a laser light beam (13), that allows the user to cut, by means of a knife (12) or other similar kitchen tool used for cutting a cake (10), pizza or similar foods (11), by following the cutting path projected through a laser light beam (13).

* * * * *